US006286373B1

(12) United States Patent
Lister et al.

(10) Patent No.: US 6,286,373 B1
(45) Date of Patent: Sep. 11, 2001

(54) CORIOLIS FLOWMETER HAVING AN EXPLOSION PROOF HOUSING

(75) Inventors: Ernest Dale Lister, Westminster; John Richard McCarthy, Boulder; Curtis John Ollila; Anthony Pankratz, both of Westminster, all of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/249,058

(22) Filed: Feb. 12, 1999

(51) Int. Cl.[7] .................................. G01F 1/84; H01R 9/22
(52) U.S. Cl. ........................................ 73/861.355; 439/709
(58) Field of Search ................ 73/861.355, 861.356, 73/861.357, 861.354, 861.351; 174/65 R; 439/709, 513

(56) References Cited

U.S. PATENT DOCUMENTS

| 3,607,604 | * | 9/1971 | Nava .................................. 174/65 R |
| 4,738,144 | * | 4/1988 | Cage .................................. 73/861.355 |
| 4,768,385 | * | 9/1988 | Cage .................................. 73/861.355 |
| 5,048,350 | * | 9/1991 | Hussain et al. ................. 73/861.355 |
| 5,301,557 | * | 4/1994 | Cage et al. ...................... 73/861.355 |
| 5,399,807 | * | 3/1995 | Yarbrough et al. ............. 174/65 R |
| 5,996,225 | * | 12/1999 | Ollila et al. ..................... 73/861.357 |

FOREIGN PATENT DOCUMENTS 37 11754 A1    10/1988  (DE) .
38 42 379 A1   6/1990   (DE) .
0 642 001 A2   3/1995   (EP) .

OTHER PUBLICATIONS

Explosion–Proof and Dust–Ignition–Proof Electrical Equipment for Use in Hazardous (Classified) Locations, UL 1203, Underrwriters Laboratories, Inc. (Oct. 6, 1995).

Electrical Apparatus for Potentially Explosive Atmospheres—Flameproof Enclosures 'd', BSI Standards, BS EN 50018 (1995).

UL's Hazardous Locations Services, UL Chart, Underwirters Laboratories, Inc. (1999).

* cited by examiner

Primary Examiner—Benjamin R. Fuller
Assistant Examiner—Jagdish Patel
(74) Attorney, Agent, or Firm—Chrisman, Bynum & Johnson, P.C.

(57) ABSTRACT

A system enclosing a Coriolis flowmeter in a explosion proof housing. The explosion proof housing is structured in a way that the housing can withstand an explosion of volatile material inside the housing. The explosion proof housing prevents sparks and heat inside the housing from igniting volatile material outside the housing. Any gaps or openings in the explosion proof housing provide a flame path of sufficient length to cool a flame or hot material escaping from the housing. The use of the secondary housing as an explosion proof compartment allows the use of a driver having greater power as well as conventional leads inside the housing.

8 Claims, 8 Drawing Sheets

CORIOLIS FLOWMETER HAVING AN EXPLOSION PROOF HOUSING

FIELD OF THE INVENTION

This invention relates to a Coriolis flowmeter. More particularly, this invention relates to an intrinsically safe Coriolis flowmeter. Still more particularly, the present invention relates to using a secondary containment housing to create a Coriolis flowmeter that meets intrinsic safety requirements.

PROBLEM

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and U.S. Pat. No. Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a vibrational force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at two different points on the flow tube to produce sinusoidal signals representative of the motion of the flow tube at the two points. A phase difference of the two signals received from the sensors is calculated in units of time. The phase difference between the two sensor signals is proportional to the mass flow rate of the material flowing through the flow tube or flow tubes.

It is a problem to create an explosion proof Coriolis flowmeter for use in an explosive environment. In particular, it is a problem to create an explosion proof Coriolis flowmeter for large Coriolis flowmeters. For purposes of the present discussion, large Coriolis flowmeters have flow tubes of greater that a one inch diameter and operate at a resonant frequency of greater than one hundred hertz. Also for purposes of the present discussion, an explosive environment is an environment that includes a volatile material which can be ignited if a spark or excessive heat is introduced into the environment. Furthermore, an explosion proof device, such as a Coriolis flowmeter, is a device that is designed to ensure that a spark or excessive heat from the device does not ignite the volatile material in the environment.

In order to provide an explosion proof device, such as a Coriolis flowmeter, methods including encapsulation, pressurization, and flameproof containment may be used. Each of the above methods encloses a device to prevent the volatile material from contacting the device where heated surfaces of the device or sparks from circuitry in the device may cause an ignition of the material. If a material ignites inside an enclosure, any gaps or openings in the enclosure must provide a flame path of a sufficient length to cool the material as the material escapes from the enclosure. The cooling of the hot material prevents the hot material from igniting the volatile material outside the enclosure.

A second solution is to make a device intrinsically safe. An intrinsically safe device is a device in which all the circuitry in the device operates under a certain low energy level. By operating under a certain energy level, the device is ensured not to generate a spark or sufficient heat to cause an explosion even if the device fails in some manner. The power level needed to make a device intrinsically safe are determined by regulatory agencies such as UL in the United States, CENELEC in Europe, CSA in Canada, and TIIS in Japan. However, the power requirements for vibrating flow tubes in a large Coriolis flowmeter make it very difficult to design a Coriolis flowmeter that is intrinsically safe.

One manner in which flowmeters have been made explosion proof is to enclose the electronic drive system components mounted on the flow tubes that operate above the intrinsically safe power levels. A conventional drive system has a coil and a magnet which are mounted on flow tubes opposing one another. An alternating current is then applied to the coil which causes the magnet and coil to move in opposition to one another. The current applied to the coil is above the power levels required for the drive system to be intrinsically safe. Therefore, it is possible that the current through the coil has enough power to create a spark or sufficient heat to ignite volatile material.

In order to make the drive coil explosion proof, a sleeve is placed around the coil. The sleeve is an enclosure surrounding the coil of wire and can contain an explosion ignited by a spark or heat from the coil. Any gap in the sleeve is designed to have a flame path of sufficient length to cool any material that is ignited inside the enclosure. This prevents any material ignited inside the enclosure from igniting material outside the enclosure.

In order for the sleeve and coil to be able to withstand the pressure created by an explosion, both the sleeve and the coil must be made of metal. This is a problem because metals cause eddy currents when the magnetic field is subjected to the metal. The eddy currents are caused by the alternating of the magnetic fields through the conductive medium of the metallic sleeve and coil bobbin. These eddy current cause a reduction in the available power to drive the flow tubes. The power losses due to the eddy currents maybe so great that it is impossible to create a driver that has sufficient power to drive flow tubes of a certain mass, stiffness, or frequency. Furthermore, the cost of the components for the driver increases as more expensive metal components are used.

Additionally, the conductors that connect the driver and sensors to the flowmeter electronics must also be insulated to prevent a spark from a conductor due to a break in the conductor from causing an explosion in order for a flowmeter to be explosion proof. One manner of insulating the conductors is to place a conduit of potted material on to the flow tubes. The conductors are enclosed inside the potted conduit. However, this potted conduit on the flow tubes can cause a zero stability problem in the flowmeter. Furthermore, the potted conduit is expensive and time consuming to manufacture.

For the above reasons, there is a need in the Coriolis flowmeter art for a better manner in which to make a Coriolis flowmeter that can operate in an explosive environment while operating at power levels above intrinsically safe limits.

SOLUTION

The above and other problems are solved and an advance in the art is made by the provision of a secondary containment housing for a Coriolis flowmeter sensor that is also an explosion proof container. A secondary containment housing encloses the flow tubes of the flowmeter as well as the driver, sensors, and conductors affixed to the flow tubes. A secondary explosion proof housing is a secondary containment housing that is made of a material that is able to withstand the pressure generated by an explosion caused by an ignition of volatile material inside the housing. Any gaps or openings in an explosion proof housing provide a flame path having sufficient length to cool any flames or heated material that may escape from the housing. The use of a secondary containment housing as an explosion proof enclosure, allows the removal of enclosures around the coil in the drive system. Thus, drivers may be made of less expensive materials and may operate at higher energy levels to provide more power to oscillate the flow tubes. Furthermore, the conductors inside the housing also do not have to be enclosed in a potted conduit on the flow tubes which improves the zero stability of the flowmeter sensor.

In order to withstand the pressure resulting from an explosion, the design of secondary housing has been modified to allow the housing to withstand the pressure of an explosion. The housing is formed to enclose the flow tubes of a flowmeter within a sealed compartment. The housing has an inlet base plate proximate an inlet side of the flow tubes and an base plate proximate an outlet end of the flow tubes. The inlet and outlet base plates are platforms which are formed to allow the flow tubes to extend through the plates and form the end walls that enclose the opposing ends of the flow tubes. In a preferred embodiment, the inlet and outlet base plates are part of the inlet and outlet manifolds of the flowmeter.

Between the first end and the second end of the housing, the walls of the housing form a unshaped bend defining an arch. The arch in the wall of the housing distributes the pressure of an explosion over the entire arch and reduces the number of weak points, such as joints, in the housing that are susceptible to breakage from the pressure of an explosion.

Figure 5:
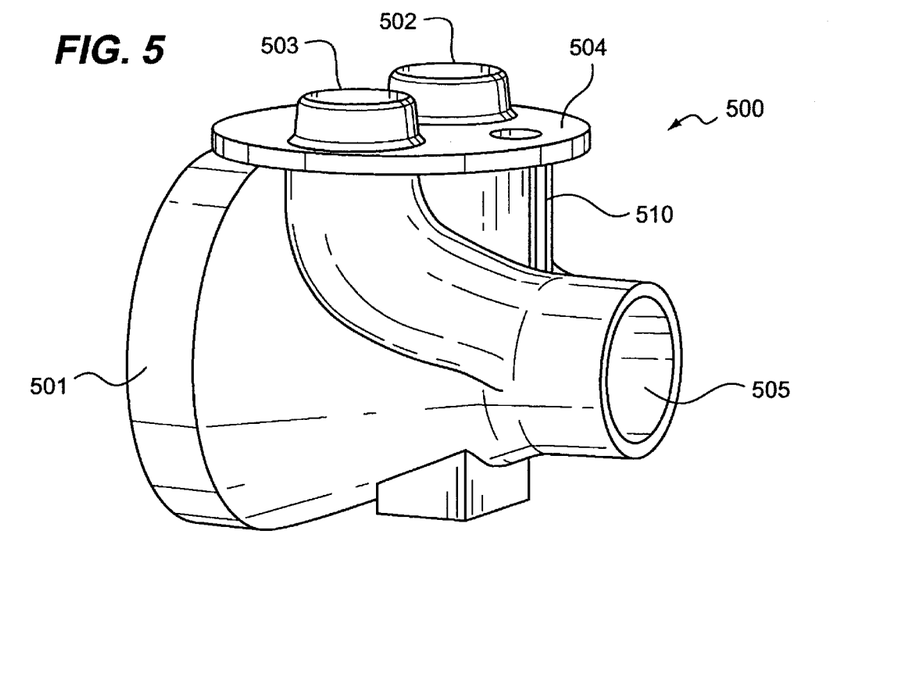

Flow tube connecting members 502 and 503 are affixed to flow tube 103A and 103B (Shown in FIG. 1) via orbital welds or some other method. Flow tube connecting members 502–503 either receive material from or direct material into flow tubes 103A and 103B (Shown in FIG. 1). A flow path inside manifold 500 connects flow tube connecting members 502–503 with inlet/outlet 505. Inlet/outlet 505 is connected to a flange 101 or 101' (Shown in FIG. 1) and receives material from or returns material to a pipeline. Manifold 500 is affixed to spacer 106 by a spacer attachment member 501 which is a member that is configured to male with spacer 106. Although spacer attachment member 501 is illustrated as a circular ring member, those skilled in the art will recognize that the shape of member 501 must match the shape of spacer 106.

DESCRIPTION OF THE DRAWINGS

The above and other features of a Coriolis flowmeter having an explosion proof housing are described in the detailed description below and in the following drawings.

DETAILED DESCRIPTION

Figure 1:
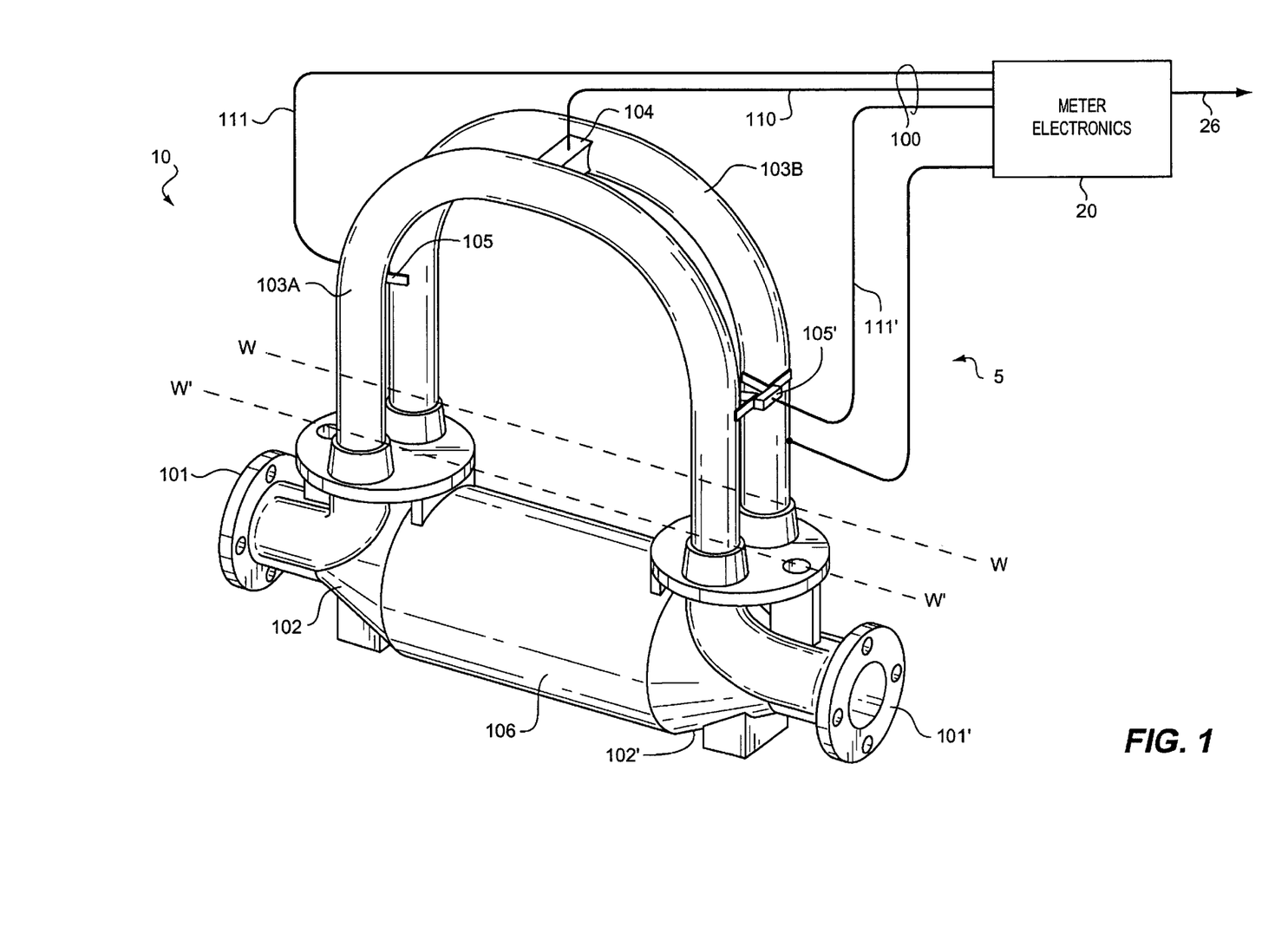
FIG. 1 illustrating a Coriolis flowmeter of the present invention.

Coriolis Flowmeter in General—FIG. 1

FIG. 1 illustrates a Coriolis flowmeter 5 comprising a flowmeter assembly 10 and meter electronics 20. Meter electronics 20 is connected to meter assembly 10 via leads 100 to provide density, mass flow rate, volume flow rate, totalized mass flow, temperature, and other information over path 26. It should be apparent to those skilled in the art that the present invention can be used by any type of Coriolis flowmeter regardless of the number of drivers, the number of pick-off sensors, the operating mode of vibration.

Flowmeter assembly 10 includes a pair of flanges 101 and 101'; manifolds 102 and 102'; driver 104; pick-off sensors 105–105'; and flow tubes 103A and 103B. Driver 104 and pick-off sensors 105 and 105' are connected to flow tubes 103A and 103B.

Flanges 101 and 101' are affixed to manifolds 102 and 102'. Manifolds 102 and 102' are affixed to opposite ends of spacer 106. Spacer 106 maintains the spacing between manifolds 102 and 102' to prevent undesired vibrations in flow tubes 103A and 103B. When flowmeter assembly 10 is inserted into a pipeline system (not shown) which carries the material being measured, material enters flowmeter assembly 10 through flange 101, passes through inlet manifold 102 where the total amount of material is directed to enter flow tubes 103A and 103B, flows through flow tubes 103A and 103B and back into outlet manifold 102' where it exits meter assembly 10 through flange 101'.

Flow tubes 103A and 103B are selected and appropriately mounted to inlet mainfold 102 and outlet manifold 102' so as to have substantially the same mass distribution, moments of inertia, and elastic modules about bending axes W—W and W'—W' respectively. The flow tubes extend outwardly from the manifolds in an essentially parallel fashion.

Flow tubes 103A–B are driven by driver 104 in opposite directions about their respective bending axes W and W' and at what is termed the first out of bending mode of the flowmeter. Driver 104 may comprise one of many well known arrangements, such as a magnet mounted to flow tube 103A and an opposing coil mounted to flow tube 103B. An alternating current is passed through the opposing coil to cause both tubes to oscillate. A suitable drive signal is applied by meter electronics 20, via lead 110 to driver 104. The description of FIG. 1 is provided merely as an example of the operation of a Coriolis flowmeter and is not intended to limit the teaching of the present invention.

Meter electronics 20 transmits a driver signal on leads 111 and 111', respectively. Meter electronics 20 produces the drive signal on lead 110 which causes driver 104 to oscillate flow tubes 103A and 103B. The present invention as described herein, can produce multiple drive signals for multiple drivers. Meter electronics 20 processes left and right velocity signals from pick-off sensors 105, 105' to compute mass flow rate. Path 26 provides an input and an output means that allows meter electronics 20 to interface with an operator. An explanation of the circuitry of meter electronics 20 is unneeded to understand the explosion proof housing of the present invention and is omitted for brevity of this description.

Figure 2:
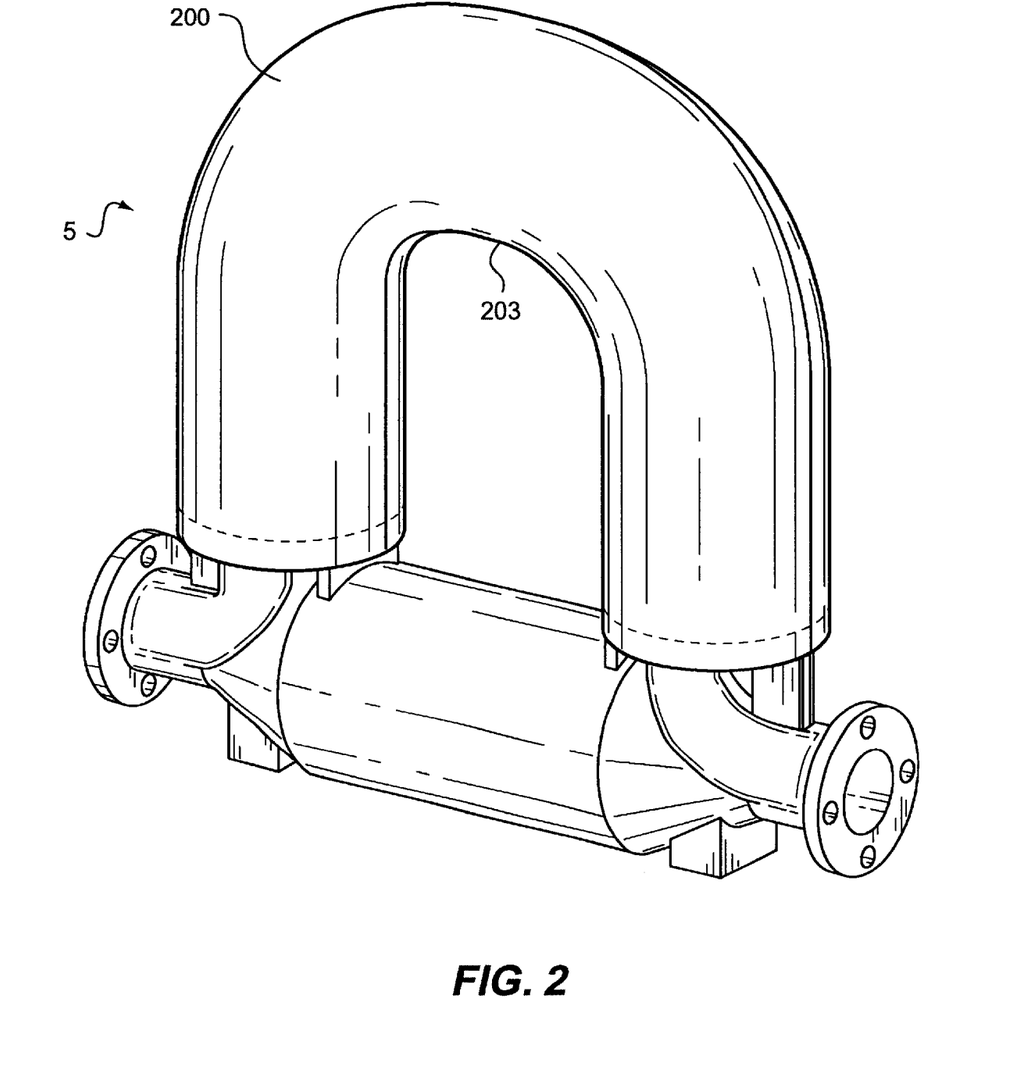
FIG. 2 illustrating an explosion proof housing affixed to a Coriolis flowmeter.

An Explosion Proof Housing—FIG. 2

FIG. 2 illustrates an explosion proof housing 200 enclosing flow tubes 103A and 103B of Coriolis flowmeter 5. It is conventional for a Coriolis flowmeter to have a secondary containment housing that encloses flow tubes 103A and 103B (Shown in FIG. 1) to prevent material from escaping in the event that one or both of flow tubes 103A and 103B rupture.

Figure 3:
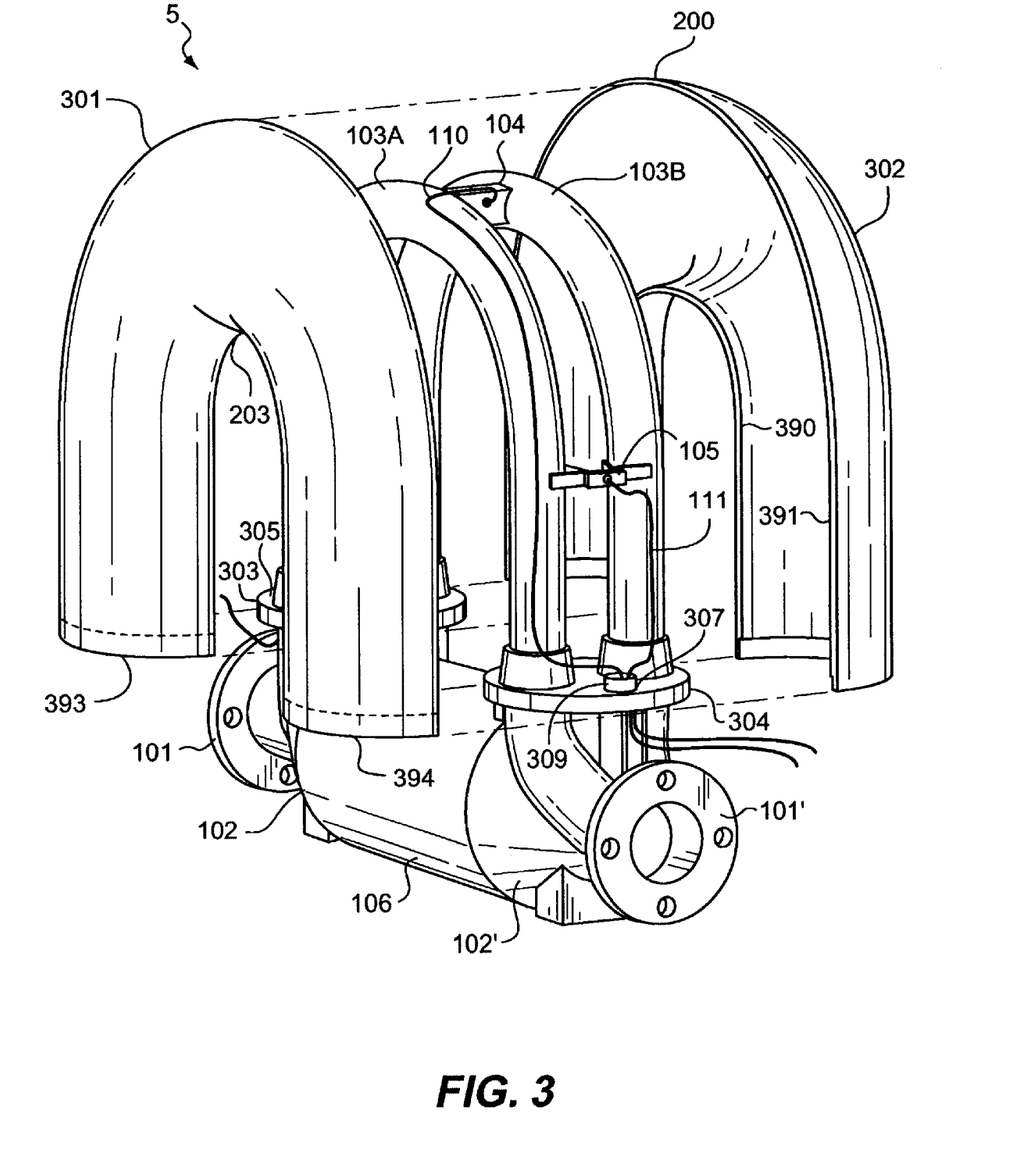
FIG. 3 illustrating an exploded view of a Coriolis flowmeter enclosed in an explosion proof housing.

In the present invention, an explosion proof housing 200 that can withstand an explosion of volatile material contained inside the housing 200 encloses flow tubes 103A–103B, driver 104, and sensors 105–105' (See FIG. 3). The explosion proof housing 200 also prevents sparks and high temperature generated by components of flowmeter assembly 10 from igniting volatile material outside the housing 200. For purposes of the present discussion, volatile material is any gas, liquid or solid that can be ignited by a spark or by application of heat. In order to withstand an explosion, housing 200 must be stronger than a conventional secondary containment housing in order to withstand the pressure generated by an explosion of volatile material in housing 200 caused by a spark from an electronic component. Electronic components inside housing 200 may include but are not limited to driver 104, sensors 105–105' and leads 110, 111–111' (See FIG. 3).

By providing an explosion proof housing 200, driver 104 (Shown in detail in FIG. 9) does not have to include an enclosure for the coil. The enclosure is typically a metal sleeve which is fitted around a coil bobbin and the wires of the coil. The metal sleeve typically causes eddy currents in the magnetic fields of the driver which reduces the power of the driver. Since the metal sleeve is not needed in explosion proof housing 200, a more powerful driver may be used in Coriolis flowmeter 5 and flow tubes capable of having greater flow rates may be produced.

Another advantage of having an explosion proof housing 200 is that a potted conduit does not have to be adhered to flow tubes 103A and 103B. The potted conduit is an insulated material which encloses leads 110,111 and 111' to prevent the leads from igniting the atmosphere inside the case causing an explosion. The potted conduit can cause a zero stability problem for flow tubes 103A and 103B. The elimination of the potted conduit eliminates the zero stability problem caused by the conduit.

One manner in which housing 200 may be strengthened to withstand an explosion inside housing 200 is to use an arch 203 in the curvature of housing 200. A typical secondary containment housing is made of several separate pieces which are welded together at angled joints to form the bend in the housing. Each joint is a point at which sufficient pressure from an explosion could tear the sections of the housing apart. Arch 203 distributes any pressure applied to the housing across the surface of the arch and reduces the joints in the housing which may be torn apart from the pressure generated by an explosion.

An exploded View of a Coriolis Flowmeter in an Explosion Proof Housing—FIG. 3.

FIG. 3 illustrates an exploded view of an exemplary embodiment of a Coriolis flowmeter 5 inside an explosion proof housing 200. Explosion proof housing 200 has a first end and a second end which enclose flow tubes 103A and 103B. In the preferred exemplary embodiment, the first end is a casting plate 303 that is affixed to manifold 102 on the inlet side of flowmeter 5 and the second end is a casting plate 304 that is affixed to manifold 102'. Those skilled in the art will recognize that although one specific design for an explosion proof housing is described, there are various methods that can be employed to enclose the flow tubes. For example, one skilled in the art will recognize that the base of explosion proof housing 200 may or may not be affixed to the inlet and outlet manifolds 102–102'. In a preferred embodiment, casting plate 303 and casting plate 304 are cast as part of manifolds 102 and 102'. However, one skilled in the art will notice that casting plates 303 and 304 may also be affixed to manifolds 102 and 102' by welds or other methods.

Housing 200 also has a first half section 301 and a second half section 302 which are the first and second sides of housing 200. First half section 301 and second half section 302 are section of walls curved between a first edge 390 and a second edge 391 to form a cylindrical enclosure when the two half sections are joined. First half section 301 and second half section 302 are also bent in into a substantially u shape between a first end 393 and a second end 394 to match the bends of flow tubes 103A and 103B.

Figure 10:
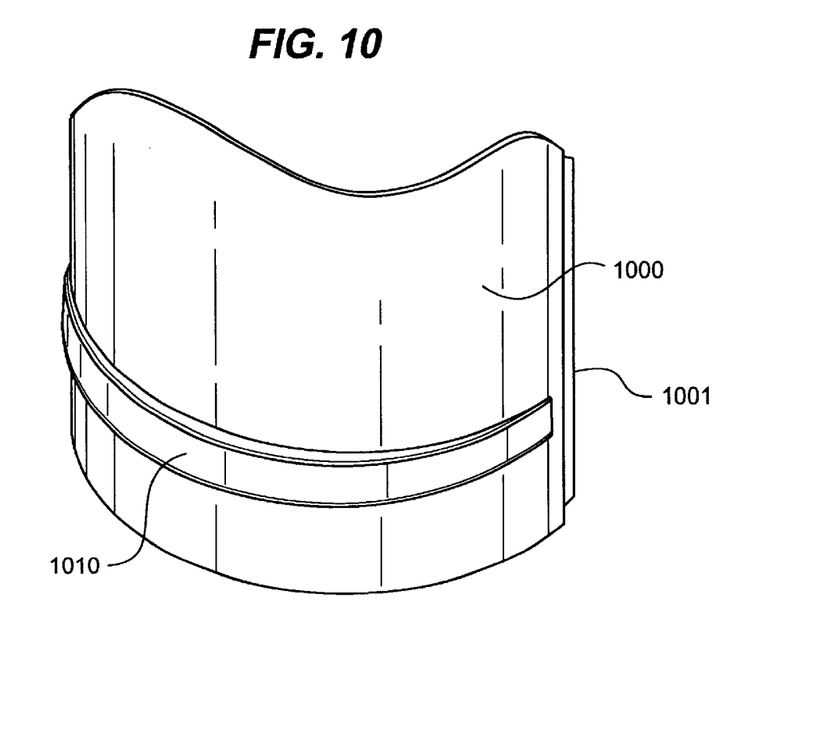
FIG. 10 illustrating a section of the housing having a rib.

FIG. 10 illustrates a portion 1000 of an outer circumference of a half section 301, 302 of housing 200 having a rib 1010. Ribs 1010 are embossed on the outer surface of a half section 301 or 302 of the housing 200. The ribs 1010 may act as a support element in each half section 301 or 302 of the housing 200. It should be noted that a half section, such as half section 301 or 302, may have any number of ribs 1010 on the outer circumference of the half section.

In order to facilitate the joining of first half section 301 and second half section 302, one half section 301 may have a lip 1001 (FIG. 10) along each edge. And, the other half section 302 of housing 200 may have a groove (not shown) along each edge to receive a mated lip from the edges of the first half section 301. As shown in FIG. 3, first half section 301 and second half section 302 are mated around flowtubes 103A and 103B and welded together or affixed in some other manner. A first end of first half section 301 and second half section 302 is welded or in some other manner affixed to casting plate 303 at the time the two sections are affixed to one another. A second end of first half section 301 and second half section 302 is also welded or in some other way affixed to casting plate 304 to enclose flow tubes 103A–103B, drivers 104, and sensors 105–105' inside housing 200.

Figure 7:
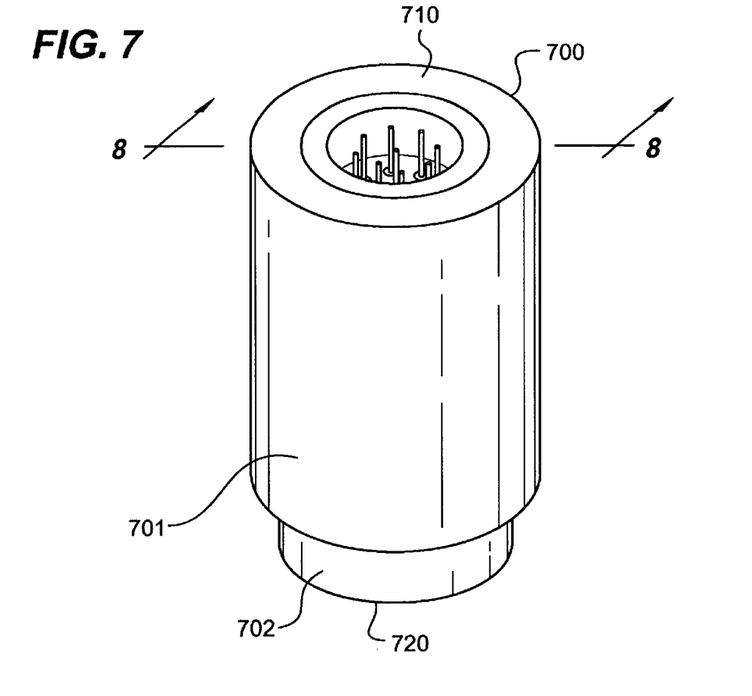
FIG. 7 illustrating one exemplary embodiment of a feedthrough for an explosion proof housing.
Figure 8:
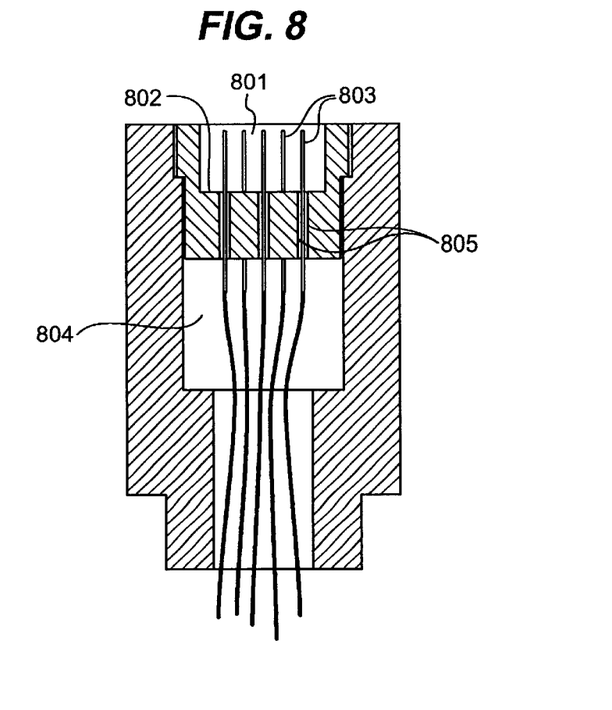
FIG. 8 illustrating a cross sectional view of the exemplary feedthough along line 8.

Conductors 110, 111, and 111' pass through opening 306 (Not seen in FIG. 3) and opening 307 to connect driver 104 and sensors 105–105' to meter electronics 20. Openings 306 (not shown in FIG. 3) and 307 must provide a flame path that is narrow and has a sufficient length to cool a heated or ignited volatile material. In order to reduce the opening to the width of the conductors, the conductors 110, 111, 111' are typically potted into the wall of housing 200. One manner of minimizing the opening to the conductors is the use of a feedthrough. In the preferred embodiment, feedthroughs 308 (not shown in FIG. 3) and 309 are devices that fit into openings 306 and 307 to prevent an explosion from escaping through openings 306 and 307 in explosion proof housing 200. Feedthroughs 308 (not shown in FIG. 3) and 309 allow leads 110, 111 and 111' to pass through openings 306 and 307. Although openings 306 and 307 are shown in case plates 303 and 304, one skilled in the art will recognize that the placement of openings 306 and 307 in housing 200 does not matter and are left to a designer of an explosion proof housing 200. An exemplary embodiment of feedthroughs 308 and 309 is illustrated in FIGS. 7–8 and described below. An adaptor may also be provided for fitting feedthroughs 308 and 309 into an opening.

Figure 4:
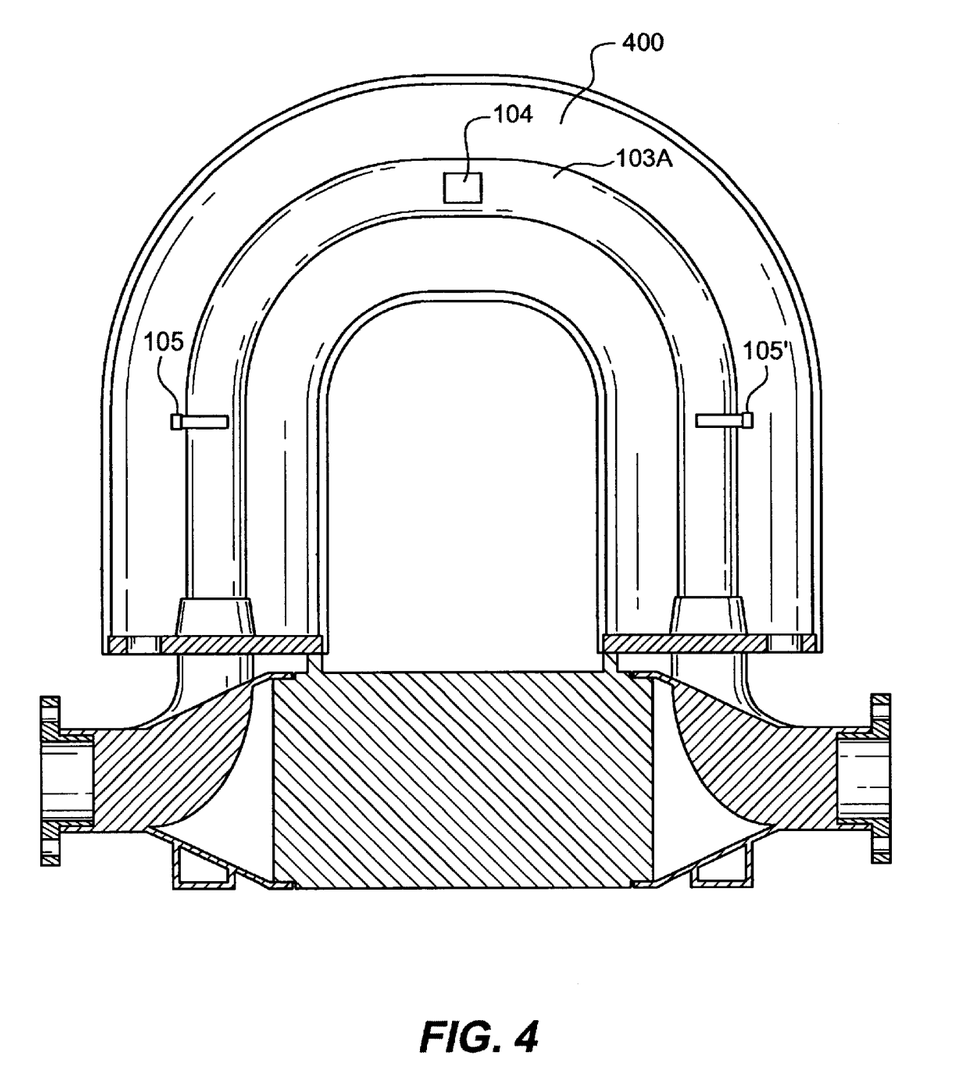
FIG. 4 illustrating a cross sectional view of a Coriolis flowmeter housed in an explosion proof housing FIG. 5 illustrating an exemplary embodiment of a manifold for a Coriolis flowmeter having an explosion proof housing.

FIG. 4 is a cross section view of explosion proof housing 200. Cavity 400 is the space around flow tubes 103A and 103B that is enclosed by housing 200. Cavity 400 provides a space between the walls of explosion proof housing 200 and the components of flow meter assembly 10. The space prevents heat from the components from be applied to the walls of housing 200 which in turn prevents the heat from being applied to volatile material outside housing 200. The volume of volatile material that can be enclosed in cavity 400 must be less than the volume of volatile material required to generate an explosion having a sufficient pressure that could cause a crack in a wall of housing 200 in order for housing 200 to maintain structural integrity during an explosion.

A Manifold for a Coriolis Flowmeter having an Explosion Proof Housing—FIG. 5.

FIG. 5 illustrates a preferred exemplary embodiment of a manifold 500 which can be used as either an input manifold 102 or an output manifold 102'. In a preferred embodiment, manifold 500 is cast as one piece during manufacture. However, those skilled in the art will recognize the various components of manifold 500 could be cast or constructed separately and then assembled into one piece. For simplicity and to reduce cost, manifold 500 is interchangeable as an inlet manifold 102 and an outlet manifold 102'. However, separate manifolds may be made for inlet manifold 102 and for outlet manifold 102'.

The explosion proof housing may have at least one opening to allow the conductors to pass through the housing to connect with the driver and sensors inside the housing with meter electronics outside the housing, The opening must provide a flame path of sufficient length to cool any hot gas or flame that escapes through the opening in an explosion. One solution is to pot the conductors into the side of the housing to reduce the flame path to the conductors passing through the housing. In order to pot the conductors into the housing, a feedthrough is used in the preferred embodiment. In the present invention, the feedthrough is a member made of material that can withstand an explosion. Conductors are potted into an opening through the feedthrough. The potted material prevents an explosion from escaping through the feedthrough and reduces the flame path to the length of each conductor that passes through the feedthrough. The feedthrough then fits into an opening in the housing and is welded or some other way affixed in place in an opening through the housing.

Casting plate 504 is a base of explosion proof housing 200 that is affixed to manifold 500. In a preferred embodiment, casting plate 504 is cast with manifold 500. This reduces the number of welds to affix explosion proof housing 200 to Coriolis flowmeter 5. The casting of casting plate 504 in manifold 500 also reduces the number of welds in flowmeter 5 which must be inspected.

Another advantage of manifold 500, is the use of ribs, such as ribs 510. The ribs 510 reduce the amount of material needed to cast manifold 500. This reduces the cost of manifold 500 as well as the susceptibility of manifold 500 to cracking.

Figure 6:
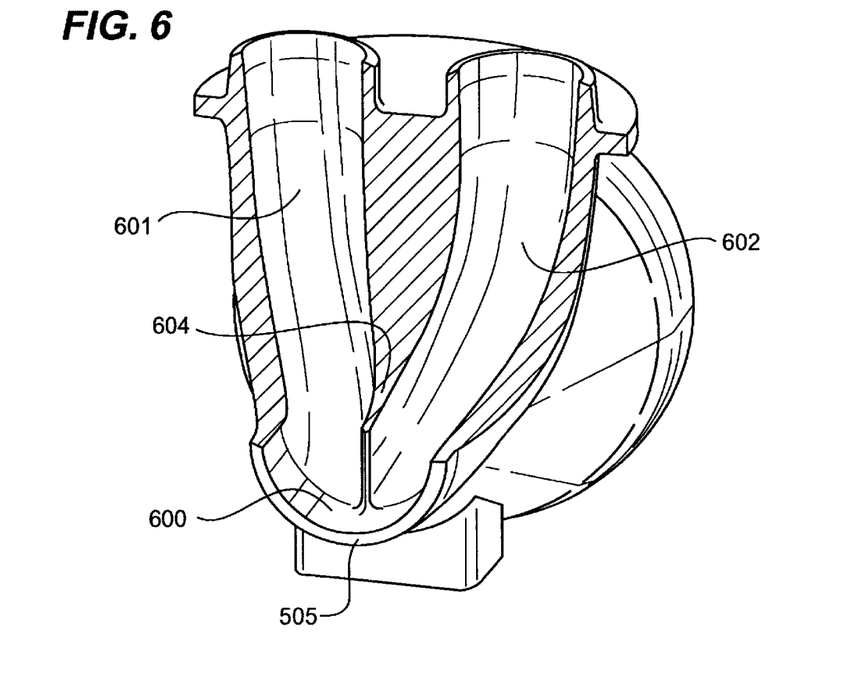
FIG. 6 illustrating a cross sectional view of a flow path through the exemplary manifold in FIG. 5.

A Cross Sectional View of a Flow Path through Manifold 500—FIG. 6.

FIG. 6 illustrates a cross sectional view of manifold 500 of FIG. 5. Flow path 600 carries material through manifold 500. Flow path 600 has a minimal volume before flow path 600 is divided into a first flow tube path 601 and a second flow tube path 602. The minimal volume before the division into the separate flow tube paths is provided by moving the divider 604 proximate to inlet/outlet 505. Divider 604 is a wall protruding into flow path 600 to divide the flow of material into first flow tube path 601 and second flow tube path 602. This solves the problem of having a large volume that forms a pool prior to the divider 604. If material is allowed to pool, eddies in the flow of material can drop the pressure of material flowing through flow tube 103A and 103B. After material enters first flow tube path 601 or second flow tube path 602, flow tube paths 601 and 602 bend to create a flow path through manifold 500 to or from flow tubes 103A and 103B. (SEE FIG. 1)

A Feedthrough for an Explosion Proof Housing 200—FIGS. 7 and 8.

FIG. 7 illustrates one embodiment of a feedthrough 700 for explosion proof housing 200. Feedthrough 700 is an opening that allows conductors from inside explosion proof housing 200 to pass through the housing to connect with electronics outside explosion proof housing 200 while maintaining the seal of explosion proof housing 200. (SEE FIG. 3) Two Examples of feedthough 700 are feedthroughs 308 and 309 illustrated in FIG. 3. One type of feedthrough is simply to pot solid conductors into an opening in a wall of explosion proof housing. However, the potting of conductors into the housing is not desirable because any error in the potting process requires the entire housing to be discarded. The use of a feedthrough allows the conductors to be the only path through which a flame or hot volatile material can escape from housing 200. Any other gaps between the feedthrough and the walls of the housing provide a flame path of sufficient length to cool the flame or hot gas to prevent ignition of the outside environment. While the following feedthough 700 is given as an example, one skilled in the art will recognize any opening that has conductors providing a sufficient flame path can be designed for use in explosion proof housing 200.

In a preferred exemplary embodiment, feedthrough 700 is a cylindrical metallic member that fits into an opening, such as opening 306 or 307 in the casting plates 303 and 304 of explosion proof housing 200. Feedthrough 700 is a cylindrical member having a first end 710 and a second end 720. The first end 710 of feedthrough 700 has a cylindrical member 701 which protrudes outward from the circumference of the first end 710. The second end 720 of feedthrough 700 is a cylindrical boss 702 which extends outward from the center of member 701. Cylindrical boss 702 is fitted into an opening with minimal spacing between the sides of the opening and the outer circumference of cylindrical boss 702. When feedthrough 700 is inserted into an opening, boss 702 extends through the opening and member 701 is affixed to the wall surrounding the opening. Member 701 is then welded or in some other way affixed to the wall adjacent to the opening.

FIG. 8 illustrates a cross sectional view of feedthrough 700. The cross sectional view reveals the components of feedthrough 700. The first end 710 of feedthrough 700 has a recessed cavity 801 that extends at least substantially through feedthrough 700 to a base 802 on the second end 720 of feedthrough 700. The base 802 has openings (Not shown) a plurality of conductors 803 extend from cavity 801 through the openings in base 802. Conductors 803 can include but are not limited to leads 110,111, and 111'. A potting material 804 is then injected into cavity 801 and may also be injected into the openings of base 802. The potting material 804 fills the space between conductors 803 to hold conductors 803 in place and to seal feedthrough 700 to prevent an explosion from escaping through an opening in feedthrough 700. Any gaps between conductors 803 and the potting material 804 of feedthrough 700 comprises a flame path 805. The flame path 805 is of sufficient length to cool a flame ignited within the explosion proof housing.

Feedthrough 700 fits into opening 307 in the following manner. Member 701 rests on the side of plate 304 adjacent to the opening 307 in explosion proof housing 200. Member 701 is welded or in some other manner affixed to plate 304. Boss 702 then extends through the opening 307. Each lead inside the housing 200 is then affixed to a conductor 803 in a feedthrough 700 on a first side of a conductor 803. A corresponding lead is then connected to a second side of each conductor 803 and is also connected to meter electronics 20.

Figure 9:
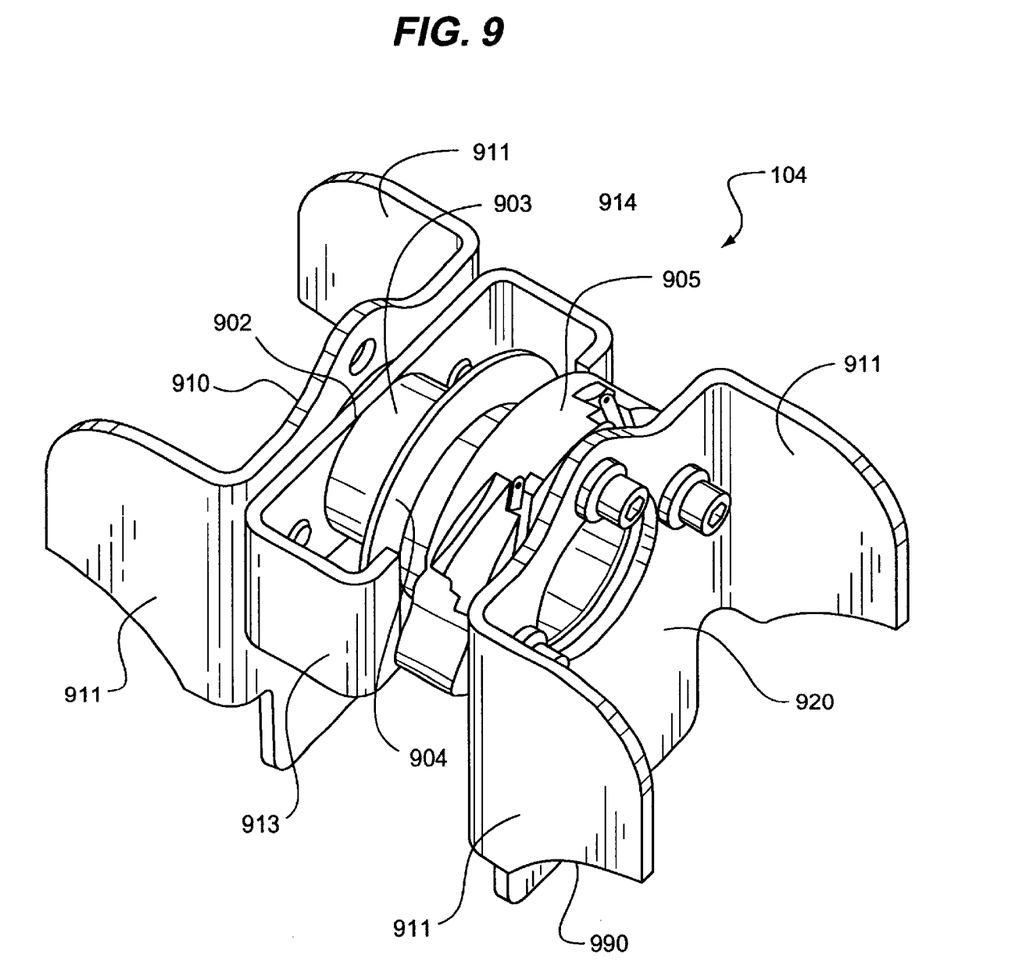
FIG. 9 illustrating a driver of a Coriolis flowmeter.
Figure 11:
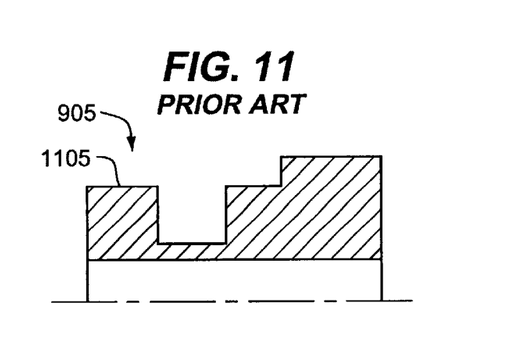
FIG. 11 illustrating a conventional coil bobbin in the prior art.

A drive system for a Coriolis Flowmeter—FIGS. 9–11.

FIG. 9 illustrates a drive system 104 for a preferred embodiment of Coriolis flowmeter 5. In a preferred exemplary embodiment, driver 104 is a coil and magnet assembly. One skilled in the art will note that other types of drive systems may be used in conjunction with the explosion proof housing 200 of the present invention.

Driver 104 has a magnet assembly 910 and a coil assembly 920. Brackets 911 extend outward in opposing directions from magnet assembly 910 and coil assembly 920. Brackets 911 are wings which extend outward from the flat base and have a substantially curved edge 990 on a bottom side that is formed to receive a flow tube 103A or 103B. The curved edge 990 of brackets 911 are then welded or in some other manner affixed to flow tubes 103A and 103B to attach driver 104 to Coriolis flowmeter 5.

Magnet assembly 910 has a magnet keeper 902 as a base. Brackets 911 extend from a first side of magnet keeper 902. Walls 913 and 914 extend outward from outer edges of a second side of magnet keeper 902. Walls 913 and 914 control the direction of the magnetic fields of magnet 903 perpendicular to the windings of coil 904.

Magnet 903 is a substantially cylindrical magnet having a first and a second end. Magnet 903 is fitted into a magnet sleeve (Not shown). The magnet sleeve and magnet 903 are affixed to a second surface of magnet keeper 902 to secure magnet 903 in magnet assembly 910. Magnet 903 typically has a pole (not shown) affixed to its second side. The magnet pole (not shown) is a cap that is fitted to the second end of magnet 903 to direct the magnetic fields into coil 904.

Coil assembly 920 includes coil 904, and coil bobbin 905. Coil bobbin 905 is affixed to a bracket 911. Coil bobbin 905 has a spool protruding from a first surface around which coil 904 is wound. Coil 904 is mounted on coil bobbin 905 opposing magnet 903. Coil 904 is connected to lead 110 which applies alternating currents to coil 904. The alternating currents cause coil 904 and magnet 903 to attract and repel one another which in turn causes flow tubes 103A and 103B to oscillate in opposition to one another.

Figure 12:
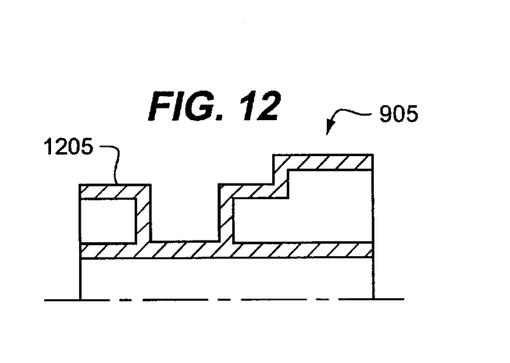
FIG. 12 illustrating a hollow coil bobbin of the present invention.

FIG. 11 illustrates a cross section of a conventional coil bobbin 1105 which may be used as coil bobbin 905 (SEE FIG. 9.). Conventional coil bobbin 1105 is machined from a solid bar of a material such as aluminum. FIG. 12 illustrates an alternative coil bobbin 1205 that may be used as coil bobbin 905 (SEE FIG. 9). Alternative coil bobbin 1205 is die cast which allows it to be hollow. This allows coil bobbin 1205 to have significantly less mass then conventional coil bobbin 1105.

The above is a description of a Coriolis flowmeter having an explosion proof housing. It is envisioned that those skilled the art can and will design alternative explosion proof housings for Coriolis flowmeters that infringe on the explosion proof housing as set forth in the claims below either literally or through the Doctrine of Equivalents.

What is claimed is:

1. A Coriolis flowmeter for use in an explosive environment that is configured to communicate with meter electronics, said flowmeter comprising:

at least one flow tube comprising an inlet end and an outlet end;

an inlet manifold affixed to said inlet end to direct a flow of material into said at least one flow tube, said inlet manifold comprising;

a casting plate that has a surface, and at least one tube opening in said surface of said casting plate of said inlet manifold that connects said inlet manifold to said at least one flow tube;

an outlet manifold affixed to said outlet end to direct said flow of material out of said at least one flow tube, said outlet manifold comprising:

a casting plate that has a surface, and at least one tube opening in said surface of said casting plate of said outlet manifold that connects said outlet manifold to said at least one flow tube;

a driver system affixed to said at least one flow tube and configured to vibrate said at least one flow tube;

sensors affixed to said at least one flow tube and configured to measure oscillations of said at least one flow tube responsive to said driver system vibrating said at least one flow tube and configured to transmit information about said oscillations to said meter electronics;

an explosion proof housing having a substantially cylindrical shape comprising a first end affixed to said surface of said casting plate of said inlet manifold and a second end affixed to said surface of said casting plate of said outlet manifold to enclose said at least one flow tube, said driver system, and said sensors, said explosion proof housing configured to contain an explosion of hot volatile material ignited inside said explosion proof housing and to prevent sparks and high temperature inside said explosion proof housing from igniting a volatile material outside of said explosion proof housing;

a conductor having a first conductor end connected to said driver system inside said explosion proof housing and a second conductor end connected to said meter electronics outside said explosion proof housing;

at least one opening in at least one of said inlet manifold and said outlet manifold through which said conductor passes from inside said explosion proof housing to outside said explosion proof housing; and a feedthrough plugged into said at least one opening through which said conductor passes from inside said explosion proof housing to outside said explosion proof housing, having a gap between said feedthrough and said conductor that defines a flame path of sufficient length to cool said hot volatile material that has been ignited in said explosion proof housing.

2. The Coriolis flowmeter of claim 1 further comprising:

other conductors having first ends connected to said sensors inside said explosion proof housing and second ends connected to said meter electronics, said other conductors pass from inside said explosion proof housing to outside said explosion proof housing through said at least one opening in said at least one of said inlet manifold and outlet manifold and through said feedthrough, and other gaps between said feedthrough and said other conductors define other flame paths having sufficient length to cool said hot volatile material that has been ignited in said explosion proof housing.

3. The Coriolis flowmeter of claim 1 wherein said at least one flow tube includes a first flow tube and a second flow tube, wherein said at least one tube opening in said surface of said casting plate of said inlet manifold includes a first tube opening and a second tube opening, and wherein said inlet manifold further comprises:

an inlet opening for receiving said flow of material,
said first tube opening provides a first flow from said inlet opening to said first flow tube, and
said second tube opening that provides a second flow from said inlet opening to said second flow tube; and a divider proximate said inlet opening which divides said flow of material from said inlet opening into said first tube opening and from said inlet opening to said second tube opening, wherein said divider is proximate said inlet opening to minimize a volume of said material in a flow path into said inlet manifold from said inlet opening to reduce eddies in said flow of material.

4. The Coriolis flowmeter of claim 1 wherein said at least one flow tube is substantially U-shaped between said inlet end and said outlet end.

5. The Coriolis flowmeter of claim 4 further comprising:

a substantially U-shaped bend between said first end and said second end of said explosion proof housing wherein said substantially U-shaped bend is defined as an arch between said first end and said second end of said explosion proof housing to distribute stress applied to said explosion proof housing over said arch.

6. The Coriolis flowmeter of claim 1 wherein said explosion proof housing is divided into a first half section and a second half section divided along a longitudinal axis between said first end and said second end of said explosion proof housing wherein said first half section and said second half section are affixed to one another and to said casting plate of said inlet manifold and said casting plate of said outlet manifold at time of assembly to enclose said at least one flow tube, said driver system, and said sensors.

7. The Coriolis flowmeter of claim 1 wherein said at least one flow tube comprises a first flow tube and a second flow tube, wherein said at least one tube opening in said surface of said casting plate of said inlet manifold includes a first tube opening and a second tube opening, and wherein said inlet manifold further comprises:

an inlet opening configured to receive said flow of material and direct said flow of material into said inlet manifold,
said first tube opening in said surface of said casting plate of said inlet manifold connects said inlet manifold to said first flow tube, and said first tube opening is connected to said inlet opening, and
said second tube opening in said surface of said casting plate of said inlet manifold connects said inlet manifold to said second flow tube, and said second tube opening is connected to said inlet opening.

8. The Coriolis flowmeter of claim 1 wherein said at least one flow tube comprises a first flow tube and a second flow tube, wherein said at least one tube opening in said surface of said casting plate of said outlet manifold includes a first tube opening and a second tube opening, and wherein said outlet manifold further comprises:

an outlet opening configured to receive said flow of material from said first flow tube and said second flow tube and direct said flow of material out of said outlet manifold,
said first tube opening in said surface of said casting plate of said outlet manifold connects said outlet manifold to said first flow tube, and said first tube opening is connected to said outlet opening, and
said second tube opening in said surface of said casting plate of said outlet manifold connects said outlet manifold to said second flow tube, and said first tube opening is connected to said outlet opening.

* * * * *

UNITED STATES PATENT AND TRADEMARK OFFICE
CERTIFICATE OF CORRECTION

PATENT NO. : 6,286,373 B1
DATED : September 11, 2001
INVENTOR(S) : Ernest Dale Lister, John Richard McCarthy, Curtis John Ollila and Anthony Pankratz It is certified that error appears in the above-identified patent and that said Letters Patent is hereby corrected as shown below:

<u>Column 3,</u>
Line 38, replace "the walls of the housing form a unshaped bend defining an"
with -- the walls of the housing form a u-shaped bend defining an --

Lines 43-57, replace "Flow tube connecting members 502 and 503 are affixed to flow tube 103A and 103B (Shown in FIG. 1) via orbital welds or some other method. Flow tube connecting members 502-503 either receive material from or direct material into flow tubes 103A and 103B (Shown in FIG. 1). A flow path inside manifold 500 connects flow tube connecting members 502-503 with inlet/outlet 505. Inlet/outlet 505 is connected to a flange 101 or 101' (Shown in FIG. 1) and receives material from or returns material to a pipeline. Manifold 500 is affixed to spacer 106 by a spacer attachment member 501 which is a member that is configured to male with spacer 106. Although spacer attachment member 501 is illustrated as a circular ring member, those skilled in the art will recognize that the shape of member 501 must match the shape of spacer 106."
with -- The explosion proof housing may have at least one opening to allow the conductors to pass through the housing to connect the driver and sensors inside the housing with meter electronics outside the housing. The opening must provide a flame path of sufficient length to cool any hot gas or flame that escapes through the opening in an explosion. One solution is to pot the conductors into the side of the housing to reduce the flame path to the conductors passing through the housing. In order to pot the conductors into the housing, a feedthrough is used in the preferred embodiment. In the present invention, the feedthrough is a member made of material that can withstand an explosion. Conductors are potted into an opening through the feedthrough. The potted material prevents an explosion from escaping through the feedthrough and reduces the flame path to the length of each conductor that passes through the feedthrough. The feedthrough then fits into an opening in the housing and is welded or some other way affixed in place in an opening through the housing. --

UNITED STATES PATENT AND TRADEMARK OFFICE
CERTIFICATE OF CORRECTION

PATENT NO.    : 6,286,373 B1
DATED         : September 11, 2001
INVENTOR(S)   : Ernest Dale Lister, John Richard McCarthy, Curtis John Ollila and Anthony Pankratz It is certified that error appears in the above-identified patent and that said Letters Patent is hereby corrected as shown below:

<u>Column 7,</u>
Lines 37-55, replace "The explosion proof housing may have at least one opening to allow the conductors to pass through the housing to connect the driver and sensors inside the housing with meter electronics outside the housing. The opening must provide a flame path of sufficient length to cool any hot gas or flame that escapes through the opening in an explosion. One solution is to pot the conductors into the side of the housing to reduce the flame path to the conductors passing through the housing. In order to pot the conductors into the housing, a feedthrough is used in the preferred embodiment. In the present invention, the feedthrough is a member made of material that can withstand an explosion. Conductors are potted into an opening through the feedthrough. The potted material prevents an explosion from escaping through the feedthrough and reduces the flame path to the length of each conductor that passes through the feedthrough. The feedthrough then fits into an opening in the housing and is welded or some other way affixed in place in an opening through the housing."
with -- Flow tube connecting members 502 and 503 are affixed to flow tube 103A and 103B (Shown in FIG. 1) via orbital welds or some other method. Flow tube connecting members 502-503 either receive material from or direct material into flow tubes 103A and 103B (Shown in FIG. 1). A flow path inside manifold 500 connects flow tube connecting members 502-503 with inlet/outlet 505. Inlet/outlet 505 is connected to a flange 101 or 101' (Shown in FIG. 1) and receives material from or returns material to a pipeline. Manifold 500 is affixed to spacer 106 by a spacer attachment member 501 which is a member that is configured to mate with spacer 106. Although spacer attachment member 501 is illustrated as a circular ring member, those skilled in the art will recognize that the shape of member 501 must match the shape of spacer 106. --

Signed and Sealed this

Twenty-seventh Day of August, 2002

*Attest:*

*Attesting Officer*

JAMES E. ROGAN
*Director of the United States Patent and Trademark Office*